United States Patent [19]

Sakaue et al.

[11] Patent Number: 5,058,098
[45] Date of Patent: Oct. 15, 1991

[54] OPTICAL RECORD MEDIUM HAVING AN IMPROVED REFLECTION THIN FILM

[75] Inventors: Mami Sakaue, Yokohama; Noriyuki Iida, Atsugi, both of Japan

[73] Assignee: Victor Company of Japan, Ltd., Japan

[21] Appl. No.: 308,080

[22] Filed: Feb. 9, 1989

[30] Foreign Application Priority Data

Feb. 17, 1988 [JP] Japan .................................. 63-34873

[51] Int. Cl.⁵ .............................................. G11B 7/24
[52] U.S. Cl. ................................. 369/284; 369/288; 346/137
[58] Field of Search .................... 369/284, 288; 346/135.1, 137; 250/486.1, 487.1, 488.1; 427/12, 53.1, 123, 191, 192, 222; 428/328, 433, 689, 697; 430/13, 14, 85, 86, 275, 277, 278

[56] References Cited

U.S. PATENT DOCUMENTS

| | | | |
|---|---|---|---|
| 4,195,312 | 3/1980 | Bell et al. ......................... | 369/284 X |
| 4,725,502 | 2/1988 | Kiyomiya et al. ............... | 369/288 X |

FOREIGN PATENT DOCUMENTS

| | | | |
|---|---|---|---|
| 0186911 | 7/1986 | European Pat. Off. . | |
| 0192256 | 8/1986 | European Pat. Off. . | |
| 3428599 | 2/1986 | Fed. Rep. of Germany ...... | 369/284 |
| 57-186244 | 11/1982 | Japan . | |
| 59-127237 | 7/1984 | Japan .................................. | 369/284 |
| 59-201247 | 11/1984 | Japan .................................. | 369/288 |
| 60-40543 | 3/1985 | Japan .................................. | 369/284 |
| 60-80144 | 5/1985 | Japan . | |
| 60-109039 | 6/1985 | Japan .................................. | 369/284 |
| 60-254433 | 12/1985 | Japan . | |
| 61-130089 | 6/1986 | Japan . | |
| 61-133355 | 6/1986 | Japan . | |
| 61-145501 | 7/1986 | Japan .................................. | 346/135.1 |
| 61-194652 | 8/1986 | Japan .................................. | 369/284 |
| 61-194656 | 8/1986 | Japan .................................. | 346/137 |
| 62-239347 | 10/1987 | Japan . | |

OTHER PUBLICATIONS

Hideaki Ooba, "Optical Information Recording Medium", *Patent Abstracts of Japan,* vol. 7, No. 121, 58-37851 (May 25, 1983), p. 25 P 199.

World Patents Index, Basic Abstract Japanese 61-133355.

*Primary Examiner*—Bentsu Ro
*Attorney, Agent, or Firm*—Lowe, Price, LeBlanc & Becker

[57] ABSTRACT

An optical information signal record medium which comprises a substance of a desired form having information signals encoded on at least one side thereof, a reflection thin layer of a Cu alloy, and a protective layer formed on the substrate in this order. The reflection thin layer is made of an alloy such as a Cu-Ni alloy, a Cu-Al alloy or a Cu-Ni-Al alloy each having a defined composition.

5 Claims, 1 Drawing Sheet

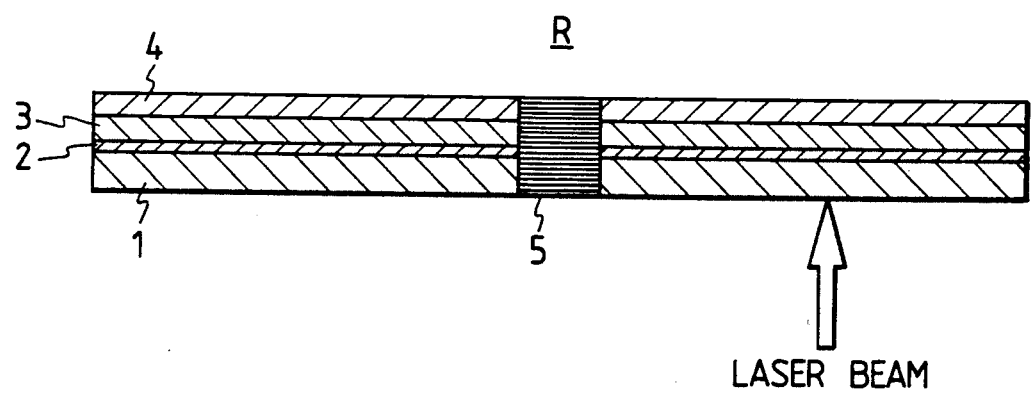

OPTICAL RECORD MEDIUM HAVING AN IMPROVED REFLECTION THIN FILM

BACKGROUND OF THE INVENTION

1. Field of the Invention

This invention relates to the art of optical information and more particularly, to an improvement in optical information record mediums such as digital audio disks, optical video disks, CD video disks, and memory disks for computers such as CD-ROM, CD-I and the like.

2. Description of the Prior Art

Known optical information record mediums have an arrangement which includes a resin substrate which is preferably optically transparent. The substrate is encoded with information signals in the form of pits directly thereon or through a cured lacquer layer at least one side of the substrate. The encoded substrate is subsequently covered on the at least one side with a reflection thin layer of, for example, aluminium. This layer has usually a thickness of 50 to 100 nm. The reflection thin layer is then covered with a protective resin layer having a thickness of approximately 6 micrometers. In practical applications, a print or ink layer is further formed on the protective resin layer.

However, these known information record mediums or disks are disadvantageous in that when they are placed under relatively severe conditions of high temperature and high humidity or are allowed to stand over a long term, the reflection thin film made of Al deteriorates so that the reflectance gradually decreases. This may eventually bring about passage of light or a laser beam, making it difficult to read out the information signal reliably. In a worst case, the medium cannot stand further use.

The above disadvantage may become more pronounced when the medium is colored as required in certain cases. For the coloration of the medium, it is usual to color both the substrate and the protective layer. For this purpose, dyes are added to compositions for the substrate and the protective layer. Such compositions generally comprise, aside from starting resins and dyes, dispersants which allow good dispersion of the dyes in the resin matrix. Such dispersants will adversely affect the reflection thin layer, thereby facilitating the layer to deteriorate. This is considered for the reason that when the Al film contacts the dye or other additives in the substrate and the protective layer, it is more liable to corrode.

SUMMARY OF THE INVENTION

It is accordingly an object of the invention to provide an optical information signal record medium in which information signals have been recorded as pits and can be optically read out by irradiation of a laser beam and which is resistant to severe environmental conditions.

It is another object of the invention to provide an optical information signal record medium which is more durable than known similar mediums using a reflection thin film made of aluminium.

It is a further object of the invention to provide an optical information signal record medium which is unlikely to deteriorate when the medium is colored.

The optical information signal record medium of the invention comprises a resin substrate having information signals encoded on at least one side thereof, a reflection thin film formed on the at least one side, and a protective layer formed on the reflection thin film. The reflection thin film is made of a Cu alloy selected from a Cu-Ni alloy consisting essentially of from 3 to 22 atomic percent of Ni and the balance of Cu, and a Cu-Al alloy consisting essentially of from 20 to 30 atomic percent of Al and the balance of Cu. Preferably, with the Cu-Ni alloy, the content of Ni is from 4 to 6 atomic percent. In this case, Al may be further added in an amount of up to 9 atomic percent. As a matter of course, an ink layer for printing may be further formed on the protective layer. Moreover, if required, information may be provided on the other side of the substrate, on which a reflection thin film, a protective layer and an ink layer may be formed similar to the above embodiment.

BRIEF DESCRIPTION OF THE DRAWING

The sole figure is a schematic side view of an optical information signal record disk according to the present invention.

DETAILED DESCRIPTION OF THE INVENTION

Referring now to the accompanying drawing, there is generally shown a record disk R which includes a resin substrate 1 having information signals on an upper side thereof as viewed in the figure. On the upper side of the substrate 1 are formed a reflection thin film 2 of a Cu alloy, a protective resin layer 3 and a print layer 4 in this order. At the center of the disk R, there is formed a hole 5 for setting the disk in position when reproduced in a suitable optical information reproducing apparatus. In this arrangement, a laser beam for reproduction of the information signals is irradiated from the side of the resin substrate as shown by arrow. In this embodiment, the information signals are illustrated as formed on one side of the substrate, but may be formed on opposite sides of the substrate. In this case, the reflection thin film 2 and the protective resin layer 3 should also be formed on the other side in this order. The construction of the disk shown in the figure is known per se. The substrate 1, the protective resin layer 3 and the print layer 4 are first described briefly.

The substrate 1 is made of a resin which should be preferably optically transparent. Examples of the resin suitable for the purpose of the invention include polycarbonate resins, polymethyl methacrylate resins, polyvinyl chloride resins, modified polycarbonate resins, and the like. The substrate 1 is illustrated in the figure as a disk but may take any other forms such as a rectangular card, if desired. The substrate 1 may be formed in a thickness sufficient to impart good mechanical strength or should have a defined thickness if standards have been provided for intended mediums. If desired, the substrate 1 may be made of a colored resin composition. For this purpose, an intended dye or dyes are added to a polymer resin indicated above in an amount suitable for attaining a desired color. As a matter of course, additives such as dispersants, surface active agents and the like may be further added in order to facilitate dispersion of the dyes.

The protective layer 3 formed on the reflection thin film 2 is usually made of a cured product of a UV curable resin. Examples of UV curable resins include epoxy-modified acrylic copolymers which are known in the art. For ensuring the protection of the medium, the layer 3 is generally formed in a thickness of from 4 to 10 micrometers. If the substrate is colored, this layer 3 should also be colored in the same color as the substrate by the use of dyes and other additives.

In practical applications, a print layer 4 is further formed on the protective layer but is not essential in the practice of the invention. The print layer is formed to provide necessary information for record mediums.

The present invention is characterized in that the reflection thin film 2 provided between the substrate 1 and the protective layer 3 is made of a specific type of alloy which is highly resistant to high temperature and high humidity conditions and also to chemicals which are used when the substrate and the protective layer are colored. Accordingly, the resultant record medium is durable and reliable over a long term and is rarely adversely influenced owing to the deterioration of the reflection film. More particularly, the reflection thin film 2 is made of a Cu alloy comprising a major proportion of Cu. The Cu alloy suitable in the present invention is either a Cu-Ni alloy consisting essentially of from 3 to 22 atomic percent of Ni and the balance of Cu or a Cu-Al alloy consisting essentially of from 20 to 30 atomic percent of Al and the balance of Cu. Preferably, the Cu-Ni alloy should consist essentially of from 4 to 6 atomic percent of Ni and the balance of Cu with or without further addition of Al in an amount of from 0 to 9 atomic percent.

With the Cu-Ni alloy, if the Ni content is larger than 22 atomic percent, the reflectance becomes poor. On the contrary, when the content is less than 3 atomic percent, characteristic properties of the medium under high temperature and high humidity conditions tend to become worsened. This is why the atomic percent range for Ni is in the range of from 3 to 22 atomic percent. For the Cu-Al alloys, if the content of Al exceeds 30 atomic percent, characteristic properties of the medium under high temperature and high humidity conditions becomes poor. At less than 20 atomic percent, the lightness of color is reduced when a colored medium is placed under high temperature and high humidity conditions over a relatively long term. Thus, the content of Al is in the range of from 20 to 30 atomic percent in the alloy.

With the preferred alloys of Ni-Al-Cu, if the Al content is larger than 9 atomic percent and the Ni content is less than 4 atomic percent, characteristic properties of the mediums tend to lower although involving little problems in practical applications. Over 6 atomic percent of the Ni content, the reflectance tends to lower. Accordingly, in this preferred embodiment, the Ni content is in the range of from 4 to 6 atomic percent and the Al content is in the range of up to 9 atomic percent.

The fabrication of the optical information record medium is not specific and the medium can be made according to any known techniques. For instance, the Cu alloy reflection thin film may be formed by sputtering or vacuum evaporation in a thickness of several tens nm.

The present invention is more particularly described by way of example.

EXAMPLE

Optical information record mediums of the type shown in the figure were made by forming on a 1.2 mm thick colored polycarbonate substrate 1 having information signals on one side thereof a 50 to 100 nm thick reflection thin film 2, a 6 micrometer thick colored protective layer 3 made of a cured epoxy modified acrylic resin and a print layer 4. The reflection thin film 2 was formed using Al for comparison and Cu alloys of the invention including Cu-Ni alloys, Cu-Al alloys and Cu-Ni-Al alloys each in a wide compositional range.

The resultant mediums were each subjected to measurements of reflectance, variations in signal characteristic and variation in color and lightness after a load test A, and a variation in signal characteristic after a load test B.

The load test A was effected as follows: a disk sample was allowed to stand under conditions of a temperature of 60° C. and a relative humidity of 90% for 96 hours, after which it was subjected to measurement of a variation of a signal characteristic by the use of a semiconductive IR laser system wherein a signal of 780 nm was recorded and reproduced, and also to measurement of color and lightness by means of a chromameter. The values of color and lightness measured were those of $a^*$ (green to red), $b^*$ (blue to yellow) and $L^*$ (lightness) in the $L^*$, $a^*$ and $b^*$ colorimetric system. The variations in the values of $a^*$ and $b^*$ were substantially proportional to the variation of $L^*$, so that the variation of the color and lightness was expressed as a difference in $L^*$, i.e. $\Delta L^*$.

The load test B was effected as follows: a disk sample was allowed to stand under conditions of a temperature of 60° C. and a relative humidity of 90% for 10,000 hours, after which a variation of a signal characteristic was measured.

The reflectance, variations in the signal characteristic and the lightness after the load test A and variation in the signal characteristic after the load test B are shown in the following table for the respective samples.

TABLE

| Reflectance (%) (at 780 nm, mirror surface) | Variation in Signal Characteristic after Load Test A | Variation in Signal Characteristic after Load Test B | Variation in Color and Lightness After Load Test A |
| --- | --- | --- | --- |
| Aluminium: | | | |
| ○ | Δ | X | ○ |
| $(100-X_1)Cu/X_1Ni$ alloy: | | | |
| ○ ($X_1 \leq 22$) | ○ | ○ ($X_1 \geq 3$) | Δ |
| $(100-X_2)Cu/X_2Al$ alloy: | | | |
| ○ | ○ | ○ ($X_2 \leq 30$) | ○ ($X_2 \geq 20$) |
| $(100-X_3-X_4)Cu/X_4Ni/X_3Al$ alloy: | | | |
| ○ ($X_4 \leq 6$) | ○ | ○ ($X_3 \leq 9, X_4 \geq 4$) | ○ |

The standards for the judgement of these characteristics are as follows.

The reflectance was judged as "○" when it was 70% or over, as "X" below 70%.

The variation in the signal characteristics was judged as "○" when it was within a specification limit, as "Δ" when it was outside a specification limit although reproducible, and as "X" when the signal was not reproducible.

The variation in the color and lightness was judged as "○" when $\Delta L^* < 3$, as "Δ" when $3 < \Delta L^* \leq 20$, and as "X" when $20 < \Delta L^*$.

As will be apparent from the above results, the disk sample using an Al reflection thin film are good with respect to the reflectance and the color and lightness after the load test A, but are poor in the signal characteristic. Especially after the load test B, the reproduction was not possible.

With Cu-Ni alloys, good results are obtained when the nickel content is in the range of from 3 to 22 atomic percent. When the content is over 22 atomic percent, the reflectance becomes poor. On the other hand, when the content of Ni is below 3 atomic percent, the variation after the load test B is adversely influenced.

With Cu-Al alloys, good results are obtained when the aluminium content is in the range of from 20 to 30 atomic percent. Outside this range, the variation in the signal characteristic after the load test B is lower when the content of Al is over 30 atomic percent. At contents less than 20 atomic percent, the color and lightness after the load test A becomes poor.

With Cu-Ni-Al alloys, when the nickel content is in the range of from 4 to 6 atomic percent and the aluminium content is in the range of up to 9 atomic percent, good results are obtained. Outside the above ranges, problems may be involved in the reflectance and the variation after the load test B.

The Cu alloys with Ni and/or Al have been described hereinabove. Various variations or modifications of the present invention may be possible within the scope of the invention. For instance, Cu alloys containing other elements such as Mn, Fe and/or Si in addition to Ni and/or Al may be usable in the practice of the invention and such alloys may include Al bronze, arms bronze and CA-1 (an alloy made of 2 to 6 atomic % of Ni, 3 to 6 atomic % of Al, 0.6 to 1.0 atomic % of Si and the balance of Cu).

What is claimed is:

1. An optical information signal record medium comprising a resin substrate having information signals encoded on at least one side thereof, a reflection thin film formed on the at least one side, and a protective layer formed on the reflection thin film, said reflection thin film being made of a Cu-Ni alloy consisting essentially of from 3 to 22 atomic percent of Ni and the balance of Cu.

2. An optical information signal record medium according to claim 1, wherein said Cu-Ni alloy has a content of Ni of from 4 to 6 atomic percent.

3. An optical information signal record medium according to claim 2, further comprising from 0 to 9 atomic percent of aluminium.

4. An optical information signal record medium according to claim 1, further comprising a print layer formed on the protective layer.

5. An optical information signal record medium according to claim 1, wherein said substrate has information signals encoded on one side thereof.

* * * * *